US008684757B2

(12) United States Patent
Bridges et al.

(10) Patent No.: US 8,684,757 B2
(45) Date of Patent: Apr. 1, 2014

(54) MEMORY MODULE CONNECTOR WITH AIR DEFLECTION SYSTEM

(75) Inventors: Jeremy S. Bridges, Apex, NC (US); William M. Megarity, Roxboro, NC (US); Luke D. Remis, Raleigh, NC (US); Gregory D. Sellman, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 13/458,373

(22) Filed: Apr. 27, 2012

(65) Prior Publication Data
US 2013/0288502 A1  Oct. 31, 2013

(51) Int. Cl.
*H01R 4/60* (2006.01)
(52) U.S. Cl.
USPC .......................................................... 439/196
(58) Field of Classification Search
USPC ........................................... 439/636, 637, 196
See application file for complete search history.

(56) References Cited

U.S. PATENT DOCUMENTS

| 3,555,493 | A | * | 1/1971 | Baumanis | 439/636 |
| 3,601,775 | A | * | 8/1971 | Longenecker et al. | 439/636 |
| 3,646,504 | A | * | 2/1972 | Classon | 439/188 |
| 4,780,095 | A | * | 10/1988 | Classon et al. | 439/637 |
| 5,004,434 | A | * | 4/1991 | Aiello et al. | 439/636 |
| 5,077,601 | A | * | 12/1991 | Hatada et al. | 257/722 |
| 5,156,552 | A | * | 10/1992 | Zaderej et al. | 439/59 |
| 5,353,191 | A | * | 10/1994 | Volz et al. | 361/690 |
| 5,584,728 | A | * | 12/1996 | Cheng | 439/637 |
| 5,784,263 | A | * | 7/1998 | Nelson | 361/785 |
| 5,815,371 | A | * | 9/1998 | Jeffries et al. | 361/704 |
| 6,239,974 | B1 | * | 5/2001 | Tseng | 361/704 |
| 6,377,470 | B1 | * | 4/2002 | Hayward et al. | 361/796 |
| 6,381,147 | B1 | * | 4/2002 | Hayward et al. | 361/756 |
| 6,394,823 | B1 | * | 5/2002 | Dunham et al. | 439/108 |
| 6,465,728 | B1 | * | 10/2002 | McLaughlin et al. | 174/16.3 |
| 6,575,776 | B1 | * | 6/2003 | Conner et al. | 439/206 |
| 6,655,976 | B1 | * | 12/2003 | Shipe et al. | 439/328 |
| 6,775,139 | B2 | * | 8/2004 | Hsueh | 361/697 |
| 6,930,889 | B2 | * | 8/2005 | Harrison et al. | 361/774 |
| 6,971,884 | B2 | * | 12/2005 | Zhao et al. | 439/62 |
| 7,023,701 | B2 | * | 4/2006 | Stocken et al. | 361/704 |
| 7,083,423 | B1 | * | 8/2006 | Guerra et al. | 439/62 |
| 7,092,252 | B2 | * | 8/2006 | Robertson | 361/690 |
| 7,106,595 | B2 | * | 9/2006 | Foster et al. | 361/721 |
| 7,142,428 | B2 | * | 11/2006 | Vackar | 361/710 |
| 7,187,552 | B1 | * | 3/2007 | Stewart et al. | 361/704 |
| 7,257,002 | B2 | * | 8/2007 | Nagahashi | 361/704 |
| 7,269,008 | B2 | | 9/2007 | Mongia et al. | |
| 7,275,966 | B2 | * | 10/2007 | Poh et al. | 439/636 |

(Continued)

FOREIGN PATENT DOCUMENTS

JP          2003338594 A     11/2003

*Primary Examiner* — Ross Gushi
(74) *Attorney, Agent, or Firm* — Katherine S. Brown; Jeffrey L. Streets

(57) ABSTRACT

In one embodiment, a memory module connector includes sidewalls extending along a length of the connector body. A longitudinally oriented socket is provided between the sidewalls for receiving a card edge of a memory module. A top of the connector defines a socket opening. A bottom of the connector is for mounting to a system board. A plurality of air deflectors is provided adjacent to the connector body to manipulate airflow to improve cooling. The size, positioning, and spacing of the air deflectors may be selected to optimize cooling.

20 Claims, 4 Drawing Sheets

(56) References Cited

U.S. PATENT DOCUMENTS

| | | | |
|---|---|---|---|
| 7,289,331 B2* | 10/2007 | Foster et al. | 361/719 |
| 7,303,443 B1* | 12/2007 | Beaman et al. | 439/637 |
| 7,342,797 B2* | 3/2008 | Kamath et al. | 361/721 |
| 7,379,297 B2* | 5/2008 | Peterson et al. | 361/690 |
| 7,403,383 B2* | 7/2008 | McGuff et al. | 361/688 |
| 7,452,242 B2* | 11/2008 | Poh et al. | 439/636 |
| 7,460,373 B2* | 12/2008 | Nagahashi | 361/704 |
| 7,471,514 B2* | 12/2008 | Chen | 361/695 |
| 7,474,529 B2* | 1/2009 | Tian et al. | 361/704 |
| 7,480,147 B2* | 1/2009 | Hoss et al. | 361/721 |
| 7,530,853 B2* | 5/2009 | Beaman et al. | 439/637 |
| 7,579,687 B2 | 8/2009 | Szewerenko et al. | |
| 7,612,446 B2* | 11/2009 | Dang et al. | 257/707 |
| 7,626,819 B1* | 12/2009 | Chen | 361/695 |
| 7,626,823 B2* | 12/2009 | Yang et al. | 361/719 |
| 7,632,127 B2* | 12/2009 | Beaman et al. | 439/327 |
| 7,654,840 B1* | 2/2010 | Zapata et al. | 439/196 |
| 7,684,196 B2 | 3/2010 | Eckberg et al. | |
| 7,688,592 B2* | 3/2010 | Gruendler et al. | 361/719 |
| 7,738,252 B2 | 6/2010 | Schuette et al. | |
| 7,916,479 B2* | 3/2011 | Sun et al. | 361/695 |
| 7,969,736 B1* | 6/2011 | Iyengar et al. | 361/699 |
| 8,038,466 B1* | 10/2011 | Tai et al. | 439/485 |
| 8,059,406 B1* | 11/2011 | Meyer et al. | 361/701 |
| 8,081,474 B1 | 12/2011 | Zohni et al. | |
| 8,102,651 B2* | 1/2012 | Bland et al. | 361/695 |
| 8,134,834 B2* | 3/2012 | Meyer et al. | 361/700 |
| 8,139,355 B2* | 3/2012 | Motschman et al. | 361/679.54 |
| 8,154,873 B2* | 4/2012 | Lian et al. | 361/715 |
| 8,177,579 B2* | 5/2012 | Tai et al. | 439/485 |
| 8,240,360 B2* | 8/2012 | Bang et al. | 165/80.3 |
| 8,303,331 B2* | 11/2012 | Yu et al. | 439/485 |
| 8,393,916 B2* | 3/2013 | Yu et al. | 439/485 |
| 8,435,047 B2* | 5/2013 | Patel et al. | 439/76.1 |
| 8,488,325 B1* | 7/2013 | Yu | 361/715 |
| 2003/0054695 A1* | 3/2003 | Kikuchi et al. | 439/636 |
| 2003/0076657 A1* | 4/2003 | Summers et al. | 361/719 |
| 2004/0250989 A1* | 12/2004 | Im et al. | 165/80.1 |
| 2006/0221573 A1* | 10/2006 | Li | 361/704 |
| 2007/0070607 A1* | 3/2007 | Goodwin | 361/719 |
| 2007/0121286 A1* | 5/2007 | Foster et al. | 361/687 |
| 2007/0155245 A1* | 7/2007 | Tsai | 439/637 |
| 2007/0217160 A1* | 9/2007 | Legen et al. | 361/704 |
| 2007/0249231 A1* | 10/2007 | Poh et al. | 439/625 |
| 2008/0101015 A1* | 5/2008 | Peterson et al. | 361/690 |
| 2008/0116571 A1* | 5/2008 | Dang et al. | 257/721 |
| 2008/0123300 A1* | 5/2008 | Tian et al. | 361/721 |
| 2008/0207029 A1* | 8/2008 | Defibaugh et al. | 439/206 |
| 2009/0251857 A1* | 10/2009 | Legen et al. | 361/689 |
| 2011/0007476 A1 | 1/2011 | Joshi et al. | |
| 2011/0136388 A1* | 6/2011 | Fu et al. | 439/637 |

* cited by examiner

MEMORY MODULE CONNECTOR WITH AIR DEFLECTION SYSTEM

BACKGROUND

1. Field of the Invention

The present invention relates generally to thermal management in a computer system, and more particularly to convective cooling of memory modules.

2. Background of the Related Art

Computer systems generate heat in relation to the amount of energy they consume. Cooling systems are used to maintain system components within prescribed temperature limits for operational reliability and safety. Various system components contribute to the total heat production of a computer system, including processors and memory. While processors are generally the hottest-running components, memory modules can also generate a significant amount of heat. In a blade server, for example, memory modules may be responsible for as much as 50% of the total server heat production. Meanwhile, increasingly powerful systems are being developed within compact chassis dimensional constraints. The correspondingly high component and thermal densities in a modern computer system therefore present significant cooling demands.

Large computer systems have especially high-powered, high-density configurations, wherein many blade servers and other power-consuming equipment are closely packed together in rack-mounted enclosures. Traditionally, a computer room air conditioning (CRAC) system provides a steady supply of chilled air for use in cooling such computer equipment. The servers and other equipment are cooled by forced-convection, using air moving devices, such as fans and chassis blower modules, to drive airflow through the computer system. The airflow through the computer system is directed to different heat-generating components of the system along engineered flow paths. However, compact chassis form factors and high component density leaves only limited space for airflow. As the density of heat generating components increases, therefore, air cooling solutions are becoming more complicated and costly.

BRIEF SUMMARY

One embodiment of a memory module connector includes a plurality of deflectors coupled to the memory module connector for manipulating airflow to improve cooling of a memory module received in the memory module connector. The memory module connector has sidewalls extending along a length of the connector, a longitudinally oriented socket between the sidewalls for receiving a card edge of a memory module, a top defining a socket opening, and a bottom for mounting to a system board. The plurality of deflectors are disposed along at least one of the sidewalls and spaced apart along the length of the connector.

Another embodiment is a memory system comprising a plurality of memory module connectors spaced apart on a system board in parallel. Each memory module connector has sidewalls extending from an upstream connector end to a downstream connector end along a length of the memory module connector, a longitudinally oriented socket between the sidewalls for receiving a card edge of a memory module, a top defining a socket opening, and a bottom for mounting to a system board. A plurality of deflectors is positioned between every two adjacent memory module connectors. Each deflector extends at least partially across a spacing between the adjacent memory module connectors.

DETAILED DESCRIPTION

Systems and methods are disclosed that enhance the convective cooling of a memory module using air deflectors strategically positioned along a memory module connector. The memory module may be a dual in-line memory module (DIMM) for connecting with a corresponding DIMM connector, although the disclosed principles may be applied to other types of memory modules and connectors. Several example embodiments are disclosed wherein a set of air deflectors are positioned adjacent to a memory module connector in a space where airflow bypass may otherwise have occurred. In a group of parallel memory module connectors, a set of air deflectors may be positioned between every two adjacent connectors and optionally on the outside of the group of connectors along the outer two (i.e. first and last) connectors in the group. The air deflectors are oriented transversely to a connector sidewall and to the received memory module. In some embodiments, a ramp extends along one or both sidewall of a memory module connector at an angle to the motherboard, and a set of the air deflectors are spaced along the ramp. The ramp at least partially blocks a space between adjacent connectors to prevent airflow bypass. In other embodiments, the ramp is omitted and the air deflectors extend outwardly from the sidewalls of the connectors and upwardly from near the motherboard. The air deflectors may be rectilinear or curved. The size and shape of the air deflectors within each set may vary according to the relative positions of the air deflectors along the connector.

The air deflectors make beneficial use of the space between connectors that would normally be a location of airflow bypass losses. A variety of different air deflector configurations are presented. In each configuration, the air deflectors manipulate the airflow in the vicinity of the memory modules to improve memory module cooling. The net airflow through the computer generated by a fan or blower module is typically directed along and parallel to the motherboard that supports the memory modules. The airflow between memory module connectors near the motherboard, which may otherwise have passed straight through due to airflow bypass, is instead directed upward along the surfaces of the memory modules to improve cooling of the memory module. Upwardly-directed airstreams mix with an upper layer of cooler airflow and are re-directed back downward, resulting in vertical turbulence. The vertical turbulence improves cooling by mixing in cooler, fresher air further from the motherboard, redirecting some of that cooler air back down along the cooling surfaces of the memory modules, and by increasing the mass airflow around the cooling surfaces.

Figure 1:
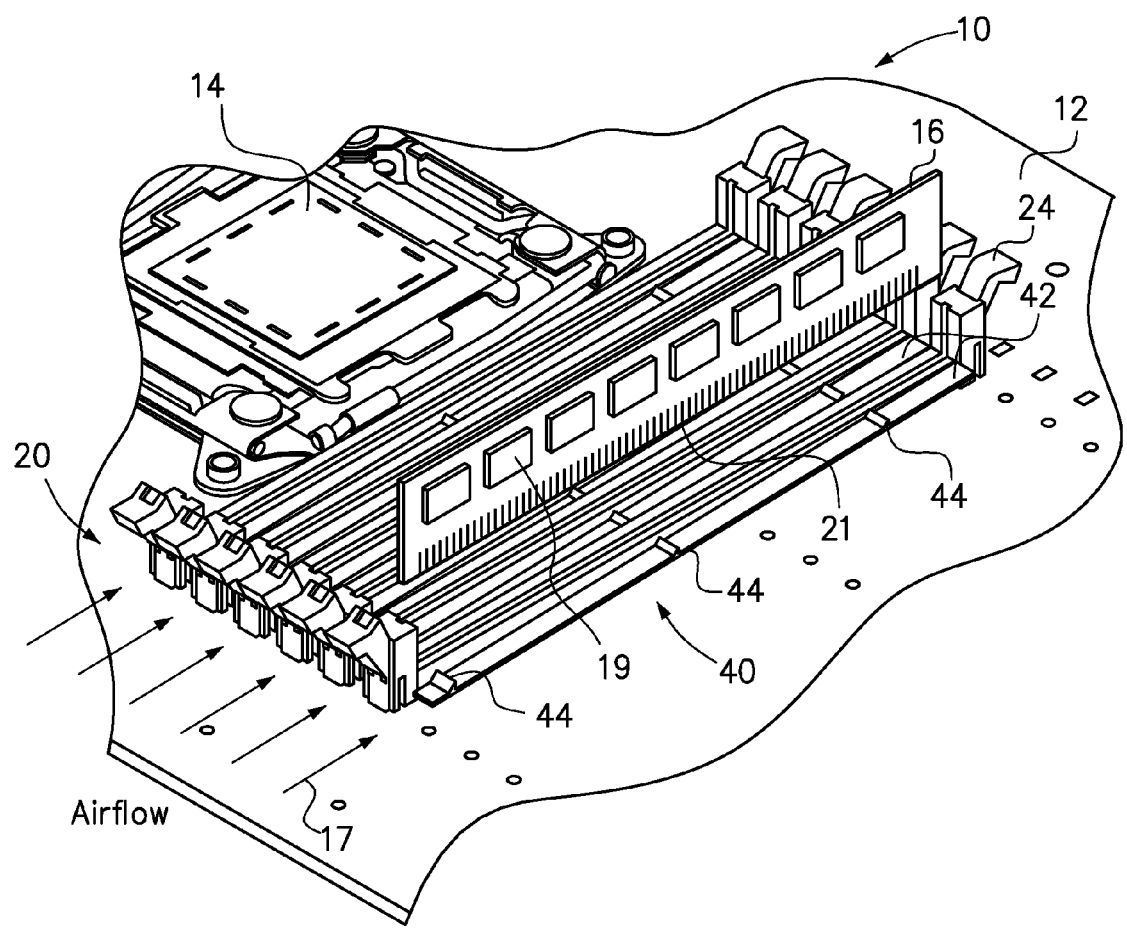
FIG. 1 is a perspective view of a representative computer memory system having air deflectors positioned adjacent to memory module connectors for improved convective cooling of memory modules to be received in the connectors.

FIG. 1 is a perspective view of a computer memory system 10 having an integrated air deflection system 40. The air deflection system 40 includes sets of air deflectors 44 positioned along ramps 42 adjacent to memory module connectors 20 for improved convective cooling of memory modules 16 to be received in the connectors 20. The memory module connectors 20 are mounted to a motherboard 12, which is the primary printed circuit board (PCB) of a computer system. The motherboard 12 supports the major computer system components, including the memory system 10 used for short-term storage of the processed software instructions and data and one or more processors 14 for processing the software instructions and data. Other conventional components (not shown) may include a hard drive for long-term storage of instructions and data and additional connectors for adding peripheral components. The motherboard 12 may be provided in any of a variety of computer systems that use removable memory modules, such as a rack-mountable server, a standalone server, or a desktop computer. The memory modules are illustrated as DIMMs, having a plurality of dual random-access memory (DRAM) chips 19 and a card edge connector 21, although one of ordinary skill in the art will appreciate that the inventive principles disclosed herein may be applied to other types of removable memory modules.

By way of example, FIG. 1 is focused on a group of six memory module connectors 20. The same motherboard 12 may also support one or more additional groups of memory module connectors. The memory module connectors 20 in the group are substantially identical. Each memory module connector 20 includes a slot or socket 22 for removably receiving one memory module 16. Only one memory module 16 is shown in FIG. 1 for ease of illustration. The socket 22 receives a card edge 21 of a respective memory module 16. The socket 22 guides the memory module 16 as it is moved into and out of connection with internal socket contacts in the memory module connector 20, as generally understood in the art. Each memory module connector 20 also has latches 24 that facilitate securing and subsequently disconnecting a memory module 16 by hand. The motherboard 12 includes a substrate with a network of etched electrical pathways, known as signal traces, over which the motherboard components can communicate. For example, the processor 14 may access the memory modules 16 over these signal traces for selectively reading and writing software instructions and data to the memory modules 16.

The various motherboard components are cooled by forced convection, whereby airflow is driven through a chassis that houses the motherboard 12. The airflow may be generated by a conventional fan or a chassis blower module (not shown) downstream of the memory system 10. The airflow may be directed through the computer system, such as a server blade, along different airflow paths engineered to target different heat-generating components in the chassis. In the vicinity of the memory modules 20, the airflow 17 is directed parallel to the motherboard 12 and in alignment with the longitudinal orientation of the memory modules 20. Airflow thus passes into the spaces between adjacent memory modules 16 and connectors 20, and also around the outer connectors 20 and memory modules.

The air deflection system 40 improves the convective cooling of the memory modules 16 by manipulating the airflow in the vicinity of the memory module connectors 20. A variety of example air deflector configurations are presented herein. The different size, shape, and positioning of the air deflectors in each of the different air deflector configurations have different effects on local airstreams, but all of the configurations result in turbulent mixing with a cooler upper level of airflow above the motherboard 12. In the embodiment of FIG. 1, one set of air deflectors 44 are positioned between every two adjacent memory module connectors 20, and along the outside of the outer two (i.e. 1st and 6th) memory module connectors 20. Each set of air deflectors 44 are positioned along an optional ramp 42, in this case three air deflectors 44 spaced along each ramp 42. The ramp 42 prevents airflow bypass between the memory module connectors 16, and guides the airflow gradually upward as it passes between the memory module connectors 20 and the received memory modules 16. The airflow that might otherwise be lost to bypass between the connectors 20 in the absence of the air deflection system 40 is instead directed up the ramps 42 to the air deflectors 44. In particular, the air deflectors 44 may redirect some of the airflow upward in a direction away from the motherboard 12, and increase the turbulence of the airflow along the surfaces of the memory modules 16.

Figure 2:
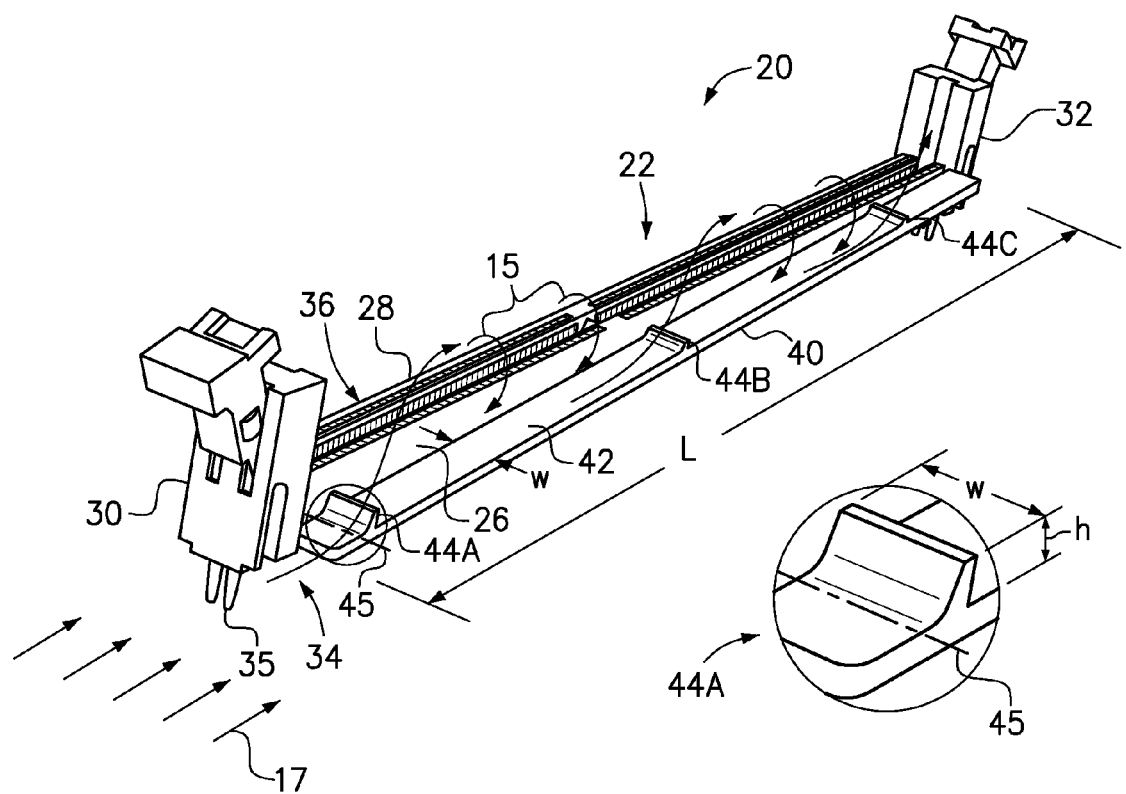
FIG. 2 is an enlarged, perspective view of a memory module connector with a set of curved air deflectors of equal width spaced apart along a ramp.

FIG. 2 is an enlarged, perspective view of one memory module connector 20 from FIG. 1, with a set of the curved air deflectors 44 of equal width "w" spaced apart along a ramp 42. The connector 20 includes a connector body having opposing sidewalls 26, 28 that extend orthogonally to the system board 12 (FIG. 1). The sidewalls 26, 28 are parallel to one another and parallel to the mother board to which the connector 20 attaches. With reference to a direction of net airflow 17 parallel to a motherboard, the sidewalls 26, 28 extend from a first, upstream end 30 to an opposing second, downstream end 32 of the connector 20 along a length "L" of the connector body. The longitudinally-oriented socket 22 is centered between the sidewalls 26, 28. The connector 20 may be conventionally secured to a motherboard with connector retention tabs 35, with a bottom 34 of the connector 20 against the motherboard. A top 36 of the connector defines an opening of the socket 22 where a card edge of the memory module is received. The ramp 42 extends upwardly from the bottom 34 of the connector 20 at the upstream end 30 to the top 36 of the connector 20 at the downstream end 32. The ramp 42 may traverse the spacing between adjacent connectors. The ramp 42 guides the airflow to the air deflectors 44 that are spaced apart along the ramp 42, and prevents airflow along the connector from bypassing the memory module.

The air deflectors 44, individually referenced as 44A, 44B, and 44C, are sized according to their positions along the ramp 42. By way of example, the first and largest air deflector 44A is enlarged for detail at an inset in FIG. 2. The ramp 42 and each air deflector 44 on the ramp 42 extend perpendicularly relative to the sidewall 26. The air deflectors 44 are transverse, and orthogonal in this embodiment, to the sidewall 26. An identical set of air deflectors 44 may also be provided on the other sidewall 28. The ramp 42 and the air deflectors 44 in this embodiment all have the same width "w," as measured in a direction orthogonal to the sidewall 26. The air deflector width w may be equal to a spacing between two adjacent connectors 20, to fill the spacing between any two adjacent connectors 20 in a group (see FIG. 1). The air deflectors 44 along the ramp 42 vary in height "h," as measured vertically from the ramp 42 in a direction orthogonal to the motherboard (see inset at 44A). The air deflector height h varies according to the position of the air deflectors 44 along the ramp 42, so that none of the air deflectors 44 extends above the top 36 of the connector. The air deflector 44A nearest the upstream end 30 is the tallest air deflector, and the air deflectors 44B and 44C are progressively shorter toward the downstream end 32.

The air deflectors 44 in this embodiment are also curved about an axis of curvature 45 (see inset at 44A) oriented perpendicular to the socket 22. The curved air deflectors 44 each have a radius of curvature with respect to the axis 45. The radius of curvature may be a constant or a variable radius, i.e. circular or non-circular. However, the air deflectors may also be flat or straight.

The effects of the air deflectors 44 on the net airflow 17 are indicated using arrows depicting individual air streams 15. Specifically, the individual airstreams 15 depict the turbulent airflow and resultant mixing that introduces cooler airflow and increases the mass airflow in the vicinity of the memory modules. The airflow adjacent to the connector 20 impinges the tallest air deflector 44A in a direction parallel with the motherboard. An airstream passing over the air deflector 44A is directed upwardly, where it mixes with a lower-speed and cooler layer of air further from the motherboard, forcing subsequent air streams 15 beyond the air deflector 44A back downward in a turbulent manner. The airflow continues downstream to the next air deflector 44B, where an airstream 15 is directed upwardly and then turbulently back downward beyond the second air deflector 44B. The airflow 17 continues downstream to the third air deflector 44C, where an air stream 15 is again directed upwardly before travelling downstream of the connector 20 and exhausted from the computer. The presence of the air deflectors 44 adjacent to the connectors 20 improves the airflow cooling characteristics, to make use of airflow between adjacent the memory module connectors 20 that ordinarily might be wasted to airflow bypass.

Figure 3:
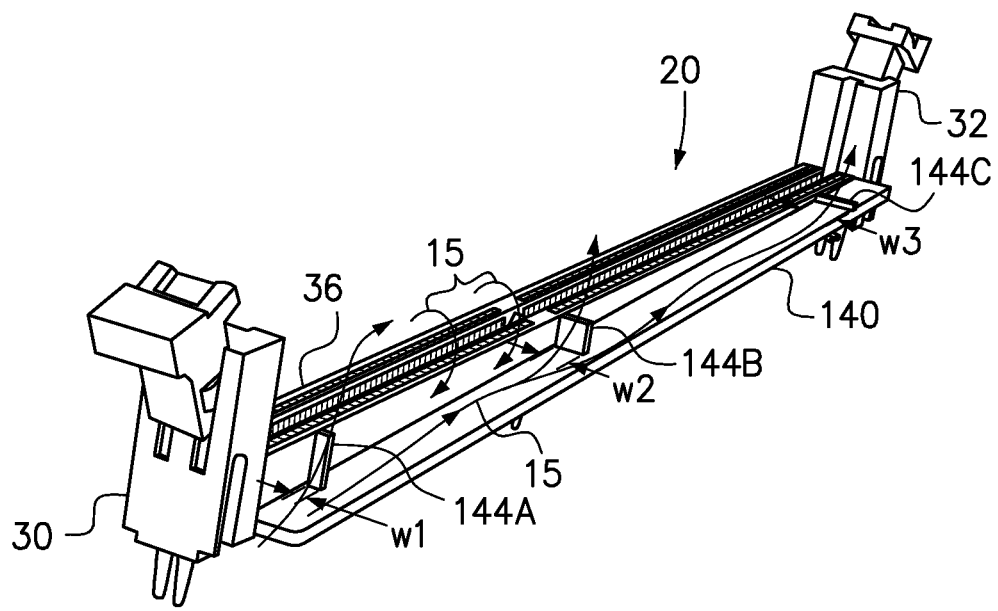
FIG. 3 is a perspective view of a memory module connector with a set of rectilinear air deflectors of varying widths spaced along a ramp.

FIG. 3 is a perspective view of the memory module connector 20 with a set of rectilinear air deflectors 144 of varying widths w1, w2, w3 spaced along a ramp 42. The rectilinear air deflectors 144 extend orthogonally from the adjacent connector sidewall 26 and orthogonally from the motherboard. The first air deflector 144A, closest to the upstream end 30 of the connector 20, is the tallest and narrowest (width=w1) of the three air deflectors 144. The second air deflector 144B, about mid-way along the ramp 42 between the upstream end 30 and downstream end 32 of the connector 20, is slightly shorter and wider (width=w2) than the first air deflector 144A. The third air deflector 144C is the furthest air deflector up the ramp 42, and is therefore the shortest but widest (width=w3) air deflector. The progressive decrease in height of the air deflectors 144A, 144B, 144C offsets the upward slope of the ramp 42 away from the motherboard, such that none of the air deflectors 144 extends above the top 36 of the connector 20.

The resulting airflow effects are again illustrated by representative air streams 15 passing over and around the air deflectors 144. As in the previous embodiment of FIG. 2, the air streams 15 passing over the air deflectors 144 are directed upwardly, where these airstreams 15 mix with an upper level of air and are directed turbulently back downward. The variable width air deflectors 144 also allow some of the air streams 15 to flow downstream, around the first two air deflectors 144A, 144B. This allows some fresher, cooler air to flow past the first two upstream air deflectors 144A, 144B and toward the rear of the connector 20, which is conventionally more challenging to cool.

Figure 4:
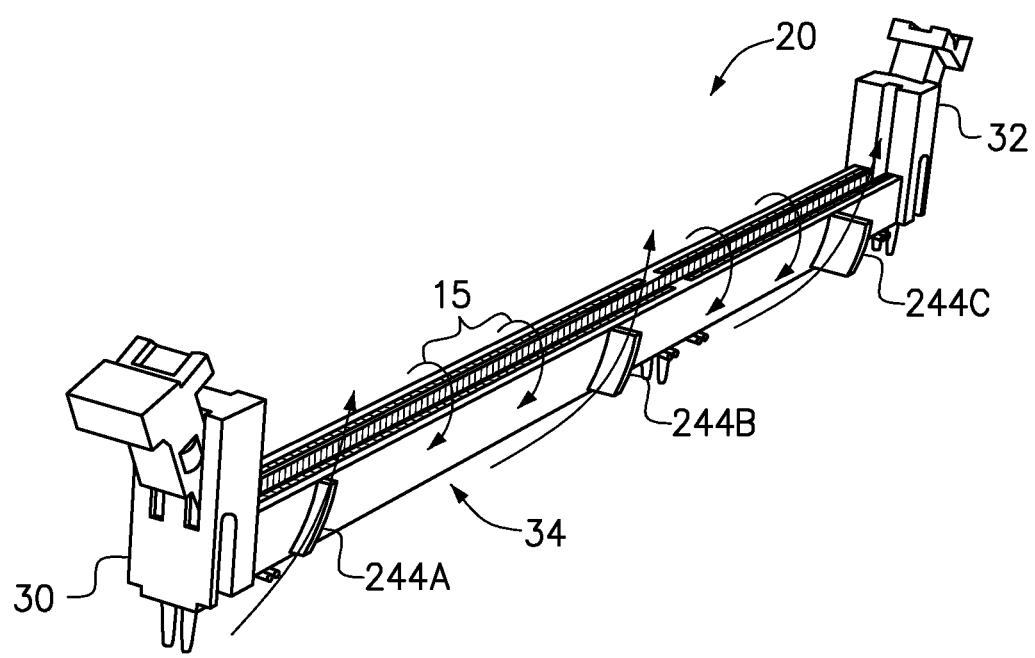
FIG. 4 is a perspective view of a memory module connector with a set of curved air deflectors that extend directly from the connector side wall, with no ramp.

FIG. 4 is a perspective view of the memory module connector 20 with a set of curved air deflectors 244 that extend directly from the connector sidewall 26, with no ramp. The body of the connector 20 and the air deflectors 244 may be molded as a unitary component. The air deflectors 244 extend all the way down to the bottom 34 of the connector 20 in order to manipulate airflow between connectors all the way down to the motherboard, which airflow may conventionally have been lost to bypass between connectors. Arrows are again drawn to illustrate air streams 15 being directed upward over the air deflectors 244 and sharply back downward, to generate turbulent airflow mixing that facilitates cooling the memory modules. The widths of the air deflectors 244 increase in a direction of the net airflow from the upstream end 30 to the downstream end 32, allowing some of the air to flow past upstream air deflectors to downstream air deflectors. In particular, in this example using three air deflectors, the varying air deflector width allows some air to flow around the first air deflector 244A to the second air deflector 244B, and allows some air to flow around the second air deflector 244B to the third air deflector 244C.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A memory module connector, comprising:
    a connector body having sidewalls extending along a length of the connector body, a longitudinally oriented socket between the sidewalls for receiving a card edge of a memory module, a top defining a socket opening, and a bottom for mounting to a system board; and
    a plurality of air deflectors spaced apart along the length of the connector body and projecting transversely from at least one of the sidewalls, wherein one or more of the air deflectors are curved about an axis oriented transversely to the socket.

2. The memory module connector of claim 1, wherein the air deflectors increase in width with respect to the at least one sidewall in an order of the spacing of the air deflectors along the length of the connector body.

3. The memory module connector of claim 2, wherein the widest air deflector is positioned the furthest toward a downstream end of the connector body.

4. The memory module connector of claim 3, wherein the widest air deflector has an air deflector width equal to a spacing between adjacent memory module connectors.

5. The memory module connector of claim 1, wherein each air deflector extends along the at least one sidewall from the top to the bottom of the connector body.

6. A memory system, comprising:
a plurality of memory module connectors spaced apart on a system board in parallel, each memory module connector having sidewalls extending from an upstream connector end to a downstream connector end along a length of the memory module connector, a longitudinally oriented socket between the sidewalls for receiving a card edge of a memory module, a top defining a socket opening, and a bottom for mounting to a system board; and
a set of air deflectors positioned between every two adjacent memory module connectors, each air deflector extending at least partially across a spacing between the adjacent memory module connectors, wherein the air deflectors in each set increase in width along the length of the adjacent memory module connectors.

7. The memory system of claim 6, wherein at least one air deflector in each set extends all the way across the spacing between the adjacent memory module connectors.

8. The memory system of claim 6, wherein the widest air deflector in each set is the furthest toward one end of the adjacent memory module connectors.

9. The memory system of claim 8, wherein the widest air deflector in each set extends all the way across the spacing from one to the other of the adjacent memory module connectors.

10. The memory system of claim 8, wherein the air deflectors in each set extend the full height of the adjacent memory module connectors.

11. The memory system of claim 8, wherein one or more of the air deflectors in each set are curved about an axis oriented transversely to the socket.

12. The memory system of claim 8, further comprising:
a ramp positioned in the spacing between every two consecutive memory module connectors, wherein the air deflectors in each set are spaced apart along the ramp.

13. The memory system of claim 12, wherein the ramp extends all the way across the spacing between the adjacent memory module connectors.

14. A memory module connector, comprising:
a connector body having sidewalls extending along a length of the connector body, a longitudinally oriented socket between the sidewalls for receiving a card edge of a memory module, a top defining a socket opening, and a bottom for mounting to a system board;
a plurality of air deflectors spaced apart along the length of the connector body and projecting transversely from at least one of the sidewalls; and
a ramp extending from the bottom of the connector body at one end to the top of the connector body at the other end, wherein the air deflectors are longitudinally spaced apart along the ramp.

15. The memory module connector of claim 14, wherein the air deflectors decrease in height in an order of the spacing of the air deflectors along the length of the connector body.

16. The memory module connector of claim 14, wherein the ramp has a ramp width equal to a spacing between adjacent memory module connectors.

17. The memory module connector of claim 14, wherein one or more of the air deflectors are curved about an axis oriented transversely to the socket.

18. The memory module connector of claim 14, wherein the air deflectors increase in width with respect to the at least one sidewall in an order of the spacing of the air deflectors along the length of the connector body.

19. The memory module connector of claim 18, wherein the widest air deflector is positioned the furthest toward a downstream end of the connector body.

20. The memory module connector of claim 19, wherein the widest air deflector has an air deflector width equal to a spacing between adjacent memory module connectors.

* * * * *